(12) United States Patent
Fujino et al.

(10) Patent No.: US 6,596,453 B2
(45) Date of Patent: Jul. 22, 2003

(54) PRODUCTION PROCESS OF POLYMERIZED TONER

(75) Inventors: Takeo Fujino, Kanagawa (JP); Kazuhiro Sato, Kanagawa (JP); Seiji Funakura, Yamaguchi (JP)

(73) Assignee: Zeon Corporation, Tokyo (JP)

( * ) Notice: Subject to any disclaimer, the term of this patent is extended or adjusted under 35 U.S.C. 154(b) by 0 days.

(21) Appl. No.: 09/963,961

(22) Filed: Sep. 26, 2001

(65) Prior Publication Data

US 2002/0042014 A1 Apr. 11, 2002

(30) Foreign Application Priority Data

Sep. 29, 2000 (JP) ........................................ 2000-298427
Sep. 29, 2000 (JP) ........................................ 2000-298428

(51) Int. Cl.$^7$ ........................... G03G 9/087; C08F 2/18
(52) U.S. Cl. ..................................... 430/137.17; 523/340
(58) Field of Search ...................... 430/137.17; 523/340

(56) References Cited

U.S. PATENT DOCUMENTS

| | | |
|---|---|---|
| 5,476,745 A | 12/1995 | Nakamura et al. |
| 5,529,873 A | 6/1996 | Chiba et al. |
| 6,100,001 A * | 8/2000 | Someda et al. ............. 430/108 |

FOREIGN PATENT DOCUMENTS

| | | |
|---|---|---|
| JP | 10-207122 | 8/1988 |
| JP | 05-066613 | 3/1993 |
| JP | 05-100485 | 4/1993 |
| JP | 07-092736 | 4/1995 |

* cited by examiner

Primary Examiner—John Goodrow
(74) Attorney, Agent, or Firm—Dinsmore & Shohl LLP

(57) ABSTRACT

The invention relates to a process for producing a polymerized toner, including the step of polymerizing a polymerizable monomer composition containing at least a polymerizable monomer and a colorant in an aqueous medium. After polymerization, an aqueous dispersion containing polymer particles formed is subjected to stripping under reduced pressure in an evaporator after polymerization. At this time, the aqueous dispersion within the evaporator is continuously taken out of the evaporator and heated in an external heat exchanger, and the heated aqueous dispersion is returned to a liquid phase within the evaporator and subjected to stripping under reduced pressure within the evaporator while circulating the aqueous dispersion, thereby distilling off volatile organic compounds. By the production process, a polymerized toner markedly reduced in the content of a residual polymerizable monomer and having excellent properties is provided.

20 Claims, 1 Drawing Sheet

PRODUCTION PROCESS OF POLYMERIZED TONER

FIELD OF THE INVENTION

The present invention relates to a production process of a toner for development of electrostatic images for developing electrostatic latent images formed by an electrophotographic process, electrostatic recording process or the like, and more particularly to a process for producing a polymerized toner for development of electrostatic images, which is markedly reduced in the content of a residual polymerizable monomer, prevented from emitting offensive odor upon fixing of the toner and excellent in environmental safety.

BACKGROUND OF THE INVENTION

In an image forming apparatus such as an electrophotographic apparatus or electrostatic recording apparatus, the formation of an image is conducted through (1) an exposure step of conducting exposure to a light pattern of the image on a photosensitive member uniformly and evenly charged to form an electrostatic latent image (electrostatic image), (2) a development step of applying a toner to the electrostatic latent image to form a toner image (visible image), (3) a transfer step of transferring the toner image to a transfer medium such as paper or OHP film, and (4) a fixing step of fusion-bonding the toner image to the transfer medium by heating and pressing, or the like.

In order to develop the electrostatic latent image formed on the photosensitive member, a developer composed mainly of a toner for development of telectrostatic images (hereinafter referred to as "toner" merely) is used. As the toner, are used colored resin particles containing at least a binder resin and a colorant, and additionally containing various kinds of additives such as a charge control agent as needed.

Processes for producing a toner are roughly divided into a grinding process and a polymerization process. The grinding process is a process of producing colored resin particles by melting a binder resin synthesized by polymerization in advance and kneading it with additive components such as a colorant, a charge control agent and a parting agent, and then grinding and classifying the kneaded product. The colored resin particles are generally called "ground toner".

The polymerization process is a process of producing colored polymer particles (i.e., colored resin particles) by mixing a polymerizable monomer with additive components such as a colorant, a charge control agent and a parting agent to prepare a polymerizable monomer composition and then polymerizing the polymerizable monomer composition by suspension polymerization, emulsion polymerization, dispersion polymerization or the like. The colored polymer particles are generally called "polymerized toner". In the polymerization process, the polymer component formed by the polymerization becomes a binder resin to directly form the colored polymer particles. Incidentally, the colored polymer particles obtained by the polymerization process may be referred to as "polymer particles" merely in some cases in the present specification.

In any technique of the grinding process and the polymerization process, it is difficult to completely react the polymerizable monomer in the polymerization step for forming the binder resin. Therefore, an unreacted polymerizable monomer remains. As a result, such a monomer comes to be contained in the toner. When the toner containing the polymerizable monomer is used in an image forming apparatus, the polymerizable monomer is vaporized out of the toner by heating in a fixing step, or the like to worsen a working environment or emit offensive odor. When the content of the polymerizable monomer in the toner is high, the toner tends to undergo blocking during its storage to aggregate or to cause an offset phenomenon or toner filming on individual members in the image forming apparatus.

In the grinding process, a polymerizable monomer is polymerized in advance to synthesize a binder resin. Therefore, an unreacted polymerizable monomer can be removed with relative ease by a washing treatment or heat treatment after the polymerization. Thereafter, the binder resin is melted and kneaded with various kinds of additive components, and the resulting mixture is ground and classified, whereby a ground toner low in content of the residual polymerizable monomer can be provided. On the other hand, in the polymerization process, a polymerized toner is obtained as polymer particles containing the various kinds of additive components by polymerizing the polymerizable monomer. Therefore, it is difficult to remove the residual unreacted polymerizable monomer.

The residual polymerizable monomer in the polymerized toner is easy to be adsorbed on the various kinds of additive components, so that its removal is difficult compared with the case of the binder resin alone. Even when the polymerized toner is fully washed after the polymerization, it is difficult to remove the residual polymerizable monomer adsorbed within the polymerized toner. The attempt to remove the residual polymerizable monomer by the heat treatment of the polymerized toner results in aggregation of the polymerized toner.

In recent years, there has been a demand for development of toners capable of being fixed at a temperature lower than before for the purpose of achieving the speeding-up of copying or printing and energy saving. There has also been a demand for development of color toners for color output, which are low in melt viscosity and easy to be uniformly melted upon fixing. As described above, there is an increasing demand in market for development of toners (hereinafter referred to as "low-temperature fixing toner") capable of being fixed at a temperature lower than before. When the glass transition temperature or melt viscosity of a binder resin component is lowered for meeting such requirements, however, it is more and more difficult to reduce the content of the residual polymerizable monomer while preventing aggregation of the resulting polymerized toner.

Many of polymerized toners are produced by a process of suspension-polymerizing a polymerizable monomer composition containing a polymerizable monomer and various kinds of additive components in an aqueous medium. In the production steps of a toner by the polymerization process, general post-treatment steps after a polymerization step include washing, dewatering and drying steps. Many processes of conducting a removing treatment of an unreacted polymerizable monomer in a post-treatment step after polymerization for the purpose of reducing the content of the unreacted polymerizable monomer remaining in the resulting polymerized toner have heretofore been investigated.

Specifically, for example, (1) a process of treating a polymerized toner after a drying step, (2) a process of treating a polymerized toner after a dewatering step, and (3) a process of treating a suspension containing a polymerized toner formed by suspension polymerization are known.

As the process (1) of treating the polymerized toner after the drying step, there is known a process in which a dry polymerized toner is heated and subjected to a deaerating treatment under reduced pressure (Japanese Patent Application Laid-Open No. 92736/1995). However, this process is difficult to reduce the content of the polymerizable monomer remaining in the polymerized toner to an extent lower than 150 ppm. In addition, the heat treatment of the dry polymerized toner shows a tendency for polymerized toner particles to aggregate to one another. In the case of low-temperature fixing toners suitable for use in high-speed printing or as color toners, the tendency to aggregate upon the heat treatment becomes particularly strong. The reason for it is that those having a low glass transition temperature, melting point or softening point are used as a polymer component, which will become a binder resin, and various kinds of additive components in the low-temperature fixing toner for the purpose of lowering the fixing temperature thereof. When the polymerized toner is heat-treated in the post-treatment step after the polymerization, these components are softened to become liable to aggregate. Accordingly, the above-described process is particularly unpractical for low-temperature fixing toners.

As the process (2) of treating the polymerized toner after the dewatering step, there has been proposed a process in which a polymerized toner in a wet state is dried under reduced pressure while pouring a gas into the toner (Japanese Patent Application Laid-Open No. 207122/1998). However, this process is difficult to reduce the content of the polymerizable monomer remaining in the polymerized toner to an extent lower than 100 ppm. Further, in this process, the polymerized toner particles are placed in a vacuum dryer to dry the toner particles while stirring them under heat. Therefore, when the process is applied to a polymerized toner suitable for low-temperature fixing, the polymerized toner particles may possibly aggregate to one another.

As the process (3) of treating the suspension containing the polymerized toner, there has been proposed a process in which a medium of the suspension is distilled off while blowing the saturated vapor of the medium of the suspension into the suspension in the latter half of the suspension polymerization reaction or after completion of the reaction (Japanese Patent Application Laid-Open No. 100485/1993). The publication states that a residual polymerizable monomer can be reduced to 70 ppm according to this process (Example 3). However, this process makes the polymerized toner particles easy to aggregate to one another by shearing force upon the contact of the saturated vapor of the medium of the suspension with the polymerized toner particles and shows a tendency to cause scale due to adhesion of the polymerized toner particles to the inner wall of an apparatus and form great agglomerate of the polymerized toner particles. Therefore, this process does not always provide a polymerized toner high in flowability. In particular, the polymerized toner particles have a stronger tendency to aggregate to deteriorate flowability as the particle diameter of the polymerized toner particles becomes smaller. The aggregation of the polymerized toner particles impedes the flowability of the polymerized toner particles to deteriorate the quality of an image formed with such a toner.

As the process (3) of treating the suspension containing the polymerized toner, besides the above, there has been proposed a process in which an aqueous medium of the suspension is distilled off while adding the aqueous medium to the suspension after completion of the polymerization reaction (Japanese Patent Application Laid-Open No. 66613/1993). However, this publication does not disclose the degree of reduction of the content of the residual polymerizable monomer in the polymerized toner. The polymerizable monomer used in the suspension polymerization slightly dissolves in water. Therefore, a residual polymerizable monomer contained in the resulting polymerized toner can be transferred to an aqueous medium if the polymerizable monomer can be brought into contact with a great amount of the aqueous medium. However, the amount of the polymerizable monomer transferred to the aqueous medium from the polymerized toner particles is lessened if the amount of the aqueous medium, with which the polymerizable monomer is brought into contact, is small.

However, according to the process of distilling off the aqueous medium while gradually adding the aqueous medium to the suspension as proposed in this publication, the efficiency to dissolve out the unreacted polymerizable monomer contained in the polymerized toner particles is not very high. Accordingly, even if this process is applied to the mass production of a polymerized toner, it cannot be expected that the content of the residual polymerizable monomer is reduced.

In this publication, it is proposed as a process of distilling off the aqueous medium to distill off the aqueous medium in an amount of 5 to 100% by weight of the suspension while heating the suspension to at least a temperature corresponding to the peak top of an endothermic peak of the resulting polymerized toner by differential scanning calorimetry (DSC). Specifically, in Examples of this publication, water is distilled off while heating the suspension to 150° C. under reduced pressure to add water. Since the temperature conditions far exceeds the boiling point of water, the aqueous medium added is easy to be distilled off. However, the distilling-off at such a high temperature is severe as treatment conditions for the polymerized toner and thus liable to incur the adhesion of the polymerized toner to the inner wall of the apparatus or coagulation thereof. In particular, this tendency more and more increases in polymerized toners which contain low-softening substances and the binder resin itself of which has a low glass transition temperature, such as the low-temperature fixing toners.

As described above, the means for reducing the content of the residual polymerizable monomer by the post-treatment steps after polymerization in the production process of a polymerized toner are variously investigated. However, such means are yet insufficient. In particular, it is thus difficult to meet the severe requirement level for environmental safety in recent years that the content of the residual polymerizable monomer is lower than 100 ppm. Further, there has not been yet found any process for reducing the content of the residual polymerizable monomer, which is suitable for industrial production of low-temperature fixing toners.

OBJECTS AND SUMMARY OF THE INVENTION

It is an object of the present invention to provide a production process of a polymerized toner, by which a polymerized toner extremely low in the content of a residual polymerizable monomer can be produced with high productivity and without impeding the excellent properties of the resulting polymerized toner.

More specifically, the object of the present invention is to provide a production process of a polymerized toner, by which a polymerizable monomer remaining in polymer particles (polymerized toner) formed can be removed with good efficiency in a post-treatment step after polymerization while preventing bubbling of an aqueous dispersion containing the polymer particles and aggregation of the polymer particles.

The present inventors have carried out an extensive investigation with a view toward achieving the above object.

As a result, it has been found that when an aqueous dispersion containing polymer particles formed is subjected to stripping under reduced pressure in an evaporator after completion of a polymerization reaction, and at this time the aqueous dispersion within the evaporator is led to an external heat exchanger to heat it, and the heated aqueous dispersion is subjected to stripping under reduced pressure while circulating the heated aqueous dispersion to a liquid phase within the evaporator, polymer particles (polymerized toner particles) markedly reduced in the content of a residual polymerizable monomer can be provided while preventing the aggregation of the polymer particles and the occurrence of scale. It has also been found that when the quantity of heat supplied is increased step by step or continuously upon the stripping of the aqueous dispersion under reduced pressure, the efficiency to reduce the content of the residual polymerizable monomer can be enhanced while preventing the aggregation of the polymer particles and the occurrence of scale. The present invention has been led to completion on the basis of these findings.

According to the present invention, there is thus provided a process for producing a polymerized toner, comprising the step of polymerizing a polymerizable monomer composition containing at least a polymerizable monomer and a colorant in an aqueous medium, wherein an aqueous dispersion containing polymer particles formed is subjected to stripping under reduced pressure in an evaporator after polymerization, and at this time the aqueous dispersion within the evaporator is continuously taken out of the evaporator and heated in an external heat exchanger, and the heated aqueous dispersion is returned to a liquid phase within the evaporator and subjected to stripping under reduced pressure within the evaporator while circulating the aqueous dispersion, thereby distilling off volatile organic compounds.

According to the present invention, there is also provided a process for producing a polymerized toner, comprising the step of polymerizing a polymerizable monomer composition containing at least a polymerizable monomer and a colorant in an aqueous medium, wherein an aqueous dispersion containing polymer particles formed is subjected to stripping under reduced pressure after polymerization, and at this time the quantity of heat supplied to the aqueous dispersion is increased step by step or continuously to subject the aqueous dispersion to stripping under reduced pressure, thereby distilling off volatile organic compounds.

PREFERRED EMBODIMENTS OF THE INVENTION

I. Raw Material

Figure 1:
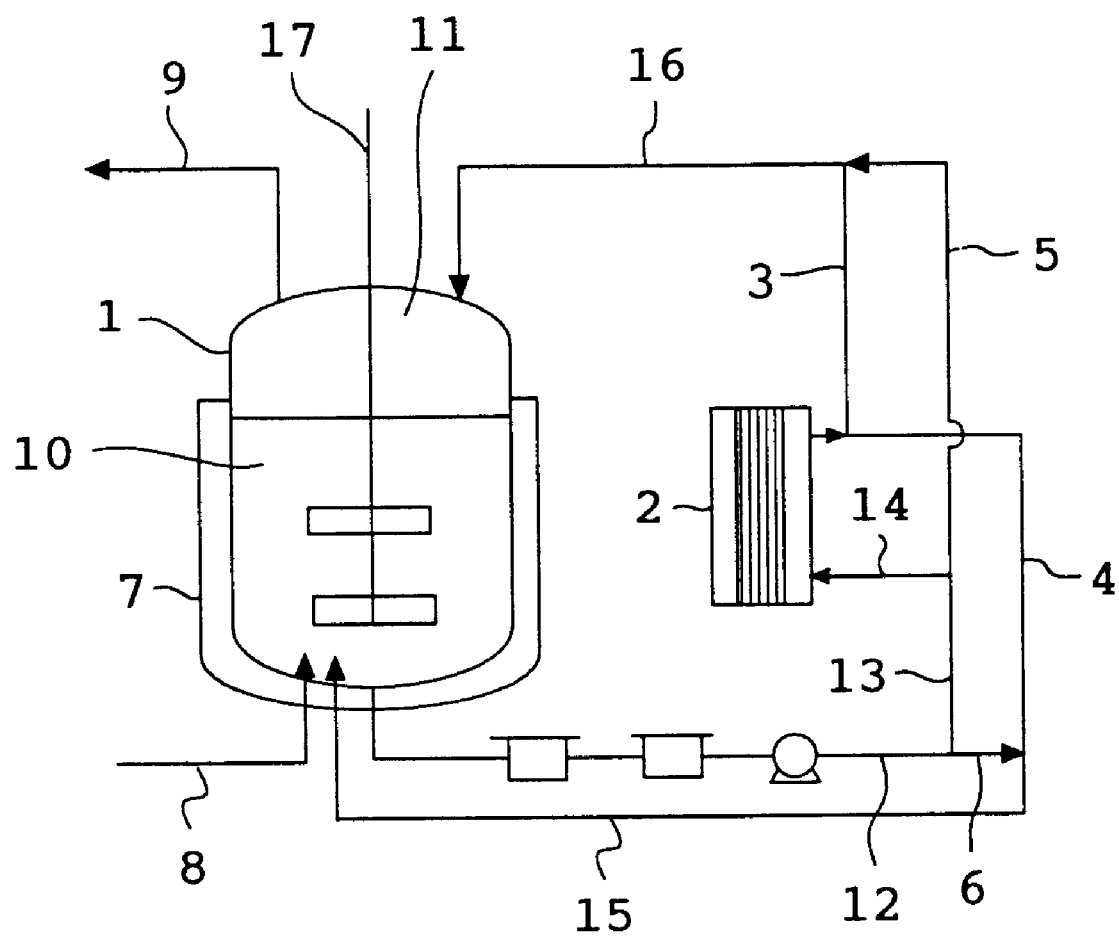
FIG. 1 schematically illustrates an evaporator used in stripping under reduced pressure, an external heat exchanger and pipe lines.

The polymerizable monomer composition used in the present invention contains at least a polymerizable monomer and a colorant and may contain various kinds of additives such as a charge control agent, a parting agent and a molecular weight modifier. The polymerizable monomer composition may also contain a crosslinkable monomer, a macromonomer and the like as a polymerizable component in addition to the polymerizable monomer. The polymerizable monomer is polymerized, thereby forming a polymer component which will become a binder resin. Colored polymer particles formed by polymerization are used as a polymerized toner. The surfaces of the colored polymer particles may be coated with a layer of a polymer having a high glass transition temperature to form polymer particles (i.e., polymerized toner) of a core·shell structure.

(1) Polymerizable Monomer

As the polymerizable monomer, is generally used a monovinyl monomer.

Specific examples of the monovinyl monomer include styrene monomers such as styrene, 4-methylstyrene and α-methylstyrene; ethylenically unsaturated carboxylic acids such as acrylic acid or methacrylic acid; ethylenically unsaturated carboxylic acid esters such as methyl acrylate, ethyl acrylate, propyl acrylate, butyl acrylate, 2-ethylhexyl acrylate, dimethylaminoethyl acrylate, methyl methacrylate, ethyl methacrylate, propyl methacrylate, butyl methacrylate, 2-ethylhexyl methacrylate and dimethylaminoethyl methacrylate; ethylenically unsaturated carboxylic acid derivatives such as acrylonitrile, methacrylonitrile, acrylamide and methacrylamide; ethylenically unsaturated monoolefins such as ethylene, propylene and butylene; vinyl halide monomers such as vinyl chloride, vinylidene chloride and vinyl fluoride; vinyl esters such as vinyl acetate and vinyl propionate; vinyl ethers such as vinyl methyl ether and vinyl ethyl ether; vinyl ketones such as vinyl methyl ketone and methyl isopropenyl ketone; and nitrogen-containing vinyl monomers such as 2-vinylpyridine, 4-vinylpyridine and N-vinylpyrrolidone.

These monomers may be used either singly or in any combination thereof. Among these monovinyl monomers, the styrene monomers, ethylenically unsaturated carboxylic acids, ethylenically unsaturated carboxylic acid esters and ethylenically unsaturated carboxylic acid derivatives are preferred. In particular, the styrene monomers and ethylenically unsaturated carboxylic acid ester s are preferably used.

(2) Crosslinkable Monomer

When a crosslinkable monomer is used together with the polymerizable monomer, the fixing ability and offset resistance of the resulting polymerized toner can be improved.

Examples of the crosslinkable monomer include aromatic divinyl compounds such as divinylbenzene, divinylnaphthalene and derivatives thereof; polyfunctional ethylenically unsaturated carboxylic acid esters such as ethylene glycol dimethacrylate and diethylene glycol dimethacrylate; N,N-divinylaniline; divinyl ether; and compounds having three or more vinyl groups.

These crosslinkable monomers may be used either singly or in any combination thereof. When the crosslinkable monomer is used, its proportion used is generally 0.05 to 5 parts by weight, preferably 0.1 to 2 parts by weight per 100 parts by weight of the monovinyl monomer.

(3) Macromonomer

In the present invention, a macromonomer may be used together with the monovinyl monomer. The macromonomer is an oligomer or polymer having a polymerizable vinyl functional group at its molecular chain terminal and a number average molecular weight of generally 1,000 to 30,000.

As examples of the polymerizable vinyl functional group that the macromonomer has at its molecular chain terminal, may be mentioned an acryloyl group and a methacryloyl group. Among these, the methacryloyl group is preferred from the viewpoint of easy copolymerization.

When the macromonomer is used, it is used in an amount of generally 0.01 to 10 parts by weight, preferably 0.03 to 5 parts by weight, more preferably 0.05 to 1 part by weight per 100 parts by weight of the monovinyl monomer. When the macromonomer is used within the above range, the resulting polymerized toner can be well balanced between the shelf stability and the fixing ability.

(4) Colorant

As examples of black colorants, may be mentioned dyes and pigment such as carbon black and Nigrosine Base; and magnetic powders such as cobalt, nickel, triiron tetroxide, manganese iron oxide, zinc iron oxide and nickel iron oxide. When carbon black is used as a colorant, that having a primary particle diameter of 20 to 40 nm is preferably used in that the resulting toner can provide images good in image quality, and the safety of the toner in environment is also enhanced.

Examples of colorants for color toners include Naphthol Yellow S, Hansa Yellow G, C.I. Pigment Yellow, C.I. Vat Yellow, eosine lake, C.I. Pigment Red, C.I. Pigment Violet, C.I. Vat Red, Phthalocyanine Blue, C.I. Pigment Blue, C.I. Vat Blue and C.I. Acid Blue.

These colorants may be used either singly or in any combination thereof. The colorant is used in a proportion of generally 0.1 to 50 parts by weight, preferably 1 to 20 parts by weight per 100 parts by weight of the monovinyl monomer.

(5) Molecular Weight Modifier

As examples of the molecular weight modifier, may be mentioned mercaptans such as t-dodecylmercaptan, n-dodecylmercaptan and n-octylmercaptan; and halogenated hydrocarbons such as carbon tetrachloride and carbon tetrabromide. These molecular weight modifiers may be added to the reaction system before the initiation of the polymerization or in the course of the polymerization. When the molecular weight modifier is used, it is used in an amount of generally 0.01 to 10 parts by weight, preferably 0.1 to 5 parts by weight per 100 parts by weight of the monovinyl monomer.

(6) Charge Control Agent

As the charge control agent, may be used various kinds of charge control agents having positively charging ability or negatively charging ability according to the desired charged polarity of the resulting polymerized toner. Specific examples of the charge control agent include metal complexes of organic compounds having a carboxyl group or a nitrogen-containing group, metallized dyes and nigrosine. As the charge control agent, may also be used a charge control resin such as a quaternary ammonium (salt) group-containing copolymer or a sulfonic (salt) group-containing copolymer.

As examples of commercially available charge control agents, may be mentioned Spiron Black TRH (product of Hodogaya Chemical Co., Ltd.), T-77 (product of Hodogaya Chemical Co., Ltd.), Bontron S-34 (product of Orient Chemical Industries Ltd.), Bontron E-84 (product of Orient Chemical Industries Ltd.), Bontron N-O1 (product of Orient Chemical Industries Ltd.) and Copy Blue-PR (product of Clariant Co.). When the charge control agent is used, it is used in an amount of generally 0.01 to 10 parts by weight, preferably 0.03 to 8 parts by weight per 100 parts by weight of the monovinyl monomer.

(7) Parting Agent

As examples of the parting agent, may be mentioned low molecular weight polyolefin waxes such as low molecular weight polyethylene, low molecular weight polypropylene and low molecular weight polybutylene; vegetable natural waxes such as candelilla wax, carnauba wax, rice wax, Japan wax and jojoba wax; petroleum waxes such as paraffin wax, microcrystalline wax and petrolatum, and modified waxes thereof; mineral waxes such as montan, ceresin and ozokerite; synthetic waxes such as Fischer-Tropsch wax; and polyfunctional ester compounds such as pentaerythritol tetramyristate and pentaerythritol tetrapalmitate.

These parting agents may be used either singly or in any combination thereof. Among these parting agents, the synthetic waxes (particularly, Fischer-Tropsch wax), synthetic polyolefins, low molecular weight polypropylene wax and microcrystalline wax are preferred. In particular, the use of a parting agent whose endothermic peak temperature falls within a range of 30 to 200° C., preferably 50 to 180° C., more preferably 60 to 160° C. is preferred, since the resulting polymerized toner can be well balanced between the fixing ability and the parting property. The endothermic peak temperature is a value measured in accordance with ASTM D 3418-82.

When the parting agent is used, it is used in an amount of generally 0.1 to 20 parts by weight, preferably 1 to 10 parts by weight per 100 parts by weight of the monovinyl monomer.

II. Polymerization Step (1) Polymerization Process

In the present invention, a polymerizable monomer composition containing at least a polymerizable monomer and a colorant is polymerized in an aqueous medium. As a polymerization process, may be adopted a publicly known process. Examples thereof include an emulsion polymerization process, a suspension polymerization process and a dispersion polymerization process. Among these, the suspension polymerization process is preferably adopted from the viewpoint of obtaining a polymerized toner which can provide image quality good in dot reproductivity. The polymerization of the polymerizable monomer composition may be conducted by either a one-stage process or at least two-stage process.

For example, as a polymerization process by the two-stage process, may be mentioned a process in which the composition of a polymerizable monomer (polymerizable monomer for core) which is polymerized in a first stage is varied from the composition of a polymerizable monomer (polymerizable monomer for shell) which is polymerized in a second stage, core particles containing a polymer component having a low glass transition temperature (Tg) are formed by the polymerization in the first stage, and a coating layer (shell) composed of a polymer having a high Tg is formed on the surfaces of the core particles by the polymerization in the second stage. By this process, polymer particles (polymerized toner) of a core-shell structure is obtained. When the polymerized toner is provided as a core-shell structure, low-temperature fixing ability and high-temperature shelf stability can be balanced at a high level.

Such a polymerized toner of the core-shell structure may also be produced by polymerizing a polymerizable monomer composition in the first stage to form polymer particles and then adding a given polymer component to cause the polymer component to be adsorbed or crusted on the polymer particles.

(2) Polymerization Initiator

As Examples of the polymerization initiator, may be mentioned persulfates such as potassium persulfate and ammonium persulfate; azo compounds such as 4,4'-azobis(4-cyanovaleric acid), 2,2'-azobis(2-amidino-propane) dihydrochloride, 2,2'-azobis(2-methyl-N(1,1'-bis(hydroxymethyl)-2-hydroxyethyl)propionamide), 2,2'-azobis(2,4-dimethylvaleronitrile), 2,2'-azobis-isobutyronitrile and 1,1'-azobis(cyclohexane-1'-carbonitrile); and peroxides such as methyl ethyl peroxide, di-t-butyl peroxide, acetyl peroxide, dicumyl peroxide, lauroyl peroxide, benzoyl peroxide, t-butyl peroxy-2-ethylhexanoate, t-butylperoxy neodecanoate, t-butylperoxy pivalate, di-isopropyl peroxydicarbonate and di-t-butyl peroxyisophthalate.

Redox initiators composed of combinations of these polymerization initiators with a reducing agent may also be mentioned. Among these, an oil-soluble polymerization initiator, which is soluble in a polymerizable monomer used, is preferably selected, and a water-soluble polymerization initiator may also be used in combination with such an initiator as needed.

The polymerization initiator is used in a proportion of generally 0.1 to 20 parts by weight, preferably 0.3 to 15 parts by weight, more preferably 0.5 to 10 parts by weight per 100 parts by weight of the monovinyl monomer.

(3) Dispersing Agent

A dispersing agent is generally used for the purpose of dispersing the polymerizable monomer composition as droplets in the aqueous medium and stably dispersing polymer particles formed in the aqueous medium. Examples of the dispersing agent include metallic compounds, such as sulfates such as barium sulfate and calcium sulfate; carbonates such as barium carbonate, calcium carbonate and magnesium carbonate; phosphates such as calcium phosphate; metal oxides such as aluminum oxide and titanium oxide; and metal hydroxides such as aluminum hydroxide, magnesium hydroxide and ferric hydroxide.

As the dispersing agent, may also be used water-soluble polymers such as polyvinyl alcohol, methyl cellulose and gelatin; anionic surfactants, nonionic surfactants and amphoteric surfactants; etc.

When suspension polymerization is conducted, a metallic compound among the dispersing agents is preferably used, with a hardly water-soluble metal hydroxide being more preferred. The hardly water-soluble metal hydroxide is particularly preferably colloid obtained by dispersing it in an aqueous medium. The use of such colloid of the hardly water-soluble metal hydroxide as a dispersing agent upon suspension polymerization is preferred because the particle diameter distribution of the resulting polymer particles can be narrowed, and the brightness or sharpness of an image formed from such a polymerized toner is enhanced. The colloid of the hardly water-soluble metal hydroxide fulfills a part of enhancing the dispersion stability of the polymer particles during stripping under reduced pressure and moreover improving both fixing ability and shelf stability of the resulting polymerized toner.

The colloid of the hardly water-soluble metal hydroxide is not limited by the production process thereof. However, colloid obtained by adjusting the pH of an aqueous solution of a water-soluble polyvalent metallic compound to 7 or higher is preferred, with colloid of a hardly water-soluble metal hydroxide formed by reacting a water-soluble polyvalent metallic compound with an alkali metal hydroxide salt in an aqueous phase being particularly preferred.

The colloid of the hardly water-soluble metallic compound preferably has number particle diameter distributions, $D_{50}$ (50% cumulative value of number particle diameter distribution) of at most 0.5 $\mu$m and $D_{90}$ (90% cumulative value of number particle diameter distribution) of at most 1 $\mu$m. If the particle diameter of the colloid is too great, the stability of the polymerization reaction system is easy to be broken, and the resulting polymerized toner also shows a tendency to deteriorate its shelf stability.

The dispersing agent is used in a proportion of generally 0.1 to 20 parts by weight, preferably 0.3 to 10 parts by weight per 100 parts by weight of the monovinyl monomer. If the proportion of the dispersion stabilizer used is too low, the particle diameter of the resulting polymerized toner becomes too great, or difficulty is encountered on the provision of a polymerized toner having the desired narrow particle diameter distribution. If the proportion of the dispersion stabilizer used is too low, it is difficult to achieve sufficient polymerization stability and dispersion stability during stripping under reduced pressure, so that polymer aggregates are liable to form. If the proportion of the dispersion stabilizer used is too high on the other hand, the particle diameter of the resulting polymerized toner becomes too small, or difficulty is encountered on the provision of a polymerized toner having the desired particle diameter distribution.

III. Vacuum Stripping Step

In the present invention, the aqueous dispersion containing the formed polymer particles obtained in the polymerization step is subjected to stripping under reduced pressure to distill off volatile organic compounds such as an unreacted polymerizable monomer and a polymerization initiator. The volatile organic compounds remain in an aqueous medium of the aqueous dispersion and the polymer particles. The stripping under reduced pressure is conducted by pouring the aqueous dispersion containing the polymer particles into an evaporator. The evaporator is connected to an external heat exchanger through a plurality of pipe lines.

The aqueous dispersion within the evaporator is circulated between the evaporator and the external heat exchanger. The aqueous dispersion within the evaporator is continuously taken out and led to the external heat exchanger, and the aqueous dispersion heated by the external heat exchanger is returned within the evaporator and subjected to stripping under reduced pressure within the evaporator while circulating the aqueous dispersion. The quantity of heat supplied to the aqueous dispersion may be retained to a certain level. However, it is preferred that the quantity of heat be increased step by step or continuously.

As described above, according to the present invention, there is provided a process for producing a polymerized toner markedly reduced in the content of a residual polymerizable monomer, comprising the step of polymerizing a polymerizable monomer composition containing at least a polymerizable monomer and a colorant in an aqueous medium, wherein an aqueous dispersion containing polymer particles formed is subjected to stripping under reduced pressure in an evaporator after polymerization, and at this time the aqueous dispersion within the evaporator is continuously taken out of the evaporator and heated in an external heat exchanger, and the heated aqueous dispersion is returned to a liquid phase within the evaporator and subjected to stripping under reduced pressure within the evaporator while circulating the aqueous dispersion, thereby distilling off volatile organic compounds.

More specifically, the production process according to the present invention is a production process of a polymerized toner, comprising the step of polymerizing a polymerizable monomer composition containing at least a polymerizable monomer and a colorant in an aqueous medium, wherein the stripping under reduced pressure is executed in accordance with the following steps:

(1) the step of pouring the aqueous dispersion containing the polymer particles formed into an evaporator after polymerization;

(2) the step of taking the poured aqueous dispersion out of the evaporator to lead it to an external heat exchanger, and returning the aqueous dispersion heated in the heat exchanger to the liquid phase composed of the aqueous dispersion remaining in the evaporator; and (3) the step of continuously conducting the step (2) repeatedly, thereby subjecting the aqueous dispersion to stripping under reduced pressure within the evaporator while circulating the aqueous dispersion between the evaporator and the external heat exchanger, to distill off volatile organic compounds together with a part of the aqueous medium, and the polymer particles are obtained by (4) the step of recovering the polymer particles from the aqueous dispersion remaining in the evaporator.

The production process of the polymerized toner according to the present invention will be described in detail with reference to FIG. 1. FIG. 1 schematically illustrates an evaporator 1 used in the stripping step under reduced pressure, an external heat exchanger 2 and pipe lines for connecting these devices to each other.

As the evaporator 1, is preferably used a tank equipped with a stirrer 17. The aqueous dispersion containing the polymer particles is poured into the evaporator 1 to form a liquid phase 10. A space for defining a vapor phase 11 is opened above the liquid phase 10. The upper part of the evaporator 1 is provided with an exhaust line 9 communicating with the vapor phase 11. The evaporator 1 may be provided with a heat medium-circulating jacket 7, a gas-blowing line 8 and the like as needed.

The aqueous dispersion of the liquid phase 10 is continuously led to the external heat exchanger 2 from the bottom of the evaporator 1 through lines 12, 13 and 14. A liquid trap, a filter, a pump, etc. are arranged in the line 12. The aqueous dispersion heated to a predetermined temperature in the external heat exchanger 2 is returned within the liquid phase 10 from the bottom of the evaporator 1 through a heated liquid phase-circulating line 4 and a line 15. The aqueous dispersion heated in the external heat exchanger 2 can be returned within the vapor phase 11 from the top of the evaporator 1 through a heated vapor phase-circulating line 3 and a line 16. The aqueous dispersion returned to the vapor phase 11 is generally flushed toward the liquid level of the liquid phase 10 from the upper part of the evaporator 1.

The aqueous dispersion heated in the external heat exchanger 2 is returned to the liquid phase 10 or the liquid phase 10 and the vapor phase 11 within the evaporator 1 to be circulated. A part of the aqueous dispersion taken out of the liquid phase 10 within the evaporator 1 can be returned to the liquid phase 10 through a non-heated liquid phase-circulating line 6 and a line 15 without heating it in the external heat exchanger 2 and/or to the vapor phase 11 through a non-heated vapor phase-circulating line 5 and a line 16. A part of the aqueous dispersion taken out of the liquid phase 10 is returned to the liquid phase 10 and/or the vapor phase 11 together with the heated aqueous dispersion without heating it in the external heat exchanger 2, whereby temperature control can be precisely conducted.

The aqueous dispersion containing the polymer particles is subjected to a stripping treatment under reduced pressure, whereby volatile organic compounds such as an unreacted polymerizable monomer and a polymerization initiator can be distilled of together with an aqueous medium in the aqueous dispersion, and thus a polymerized toner markedly reduced in the content of a residual polymerizable monomer can be provided.

The stripping treatment under reduced pressure according to the present invention is conducted within the evaporator the pressure in which has been reduced. In the stripping treatment under reduced pressure, the volatile organic compounds become gaseous, and so they are generally discharged outward from the evaporator 1 through the exhaust line 9.

As examples of the process of taking out the aqueous dispersion containing the polymer particles within the evaporator 1 portionwise, heating the portion thereof in the external heat exchanger 2 and returning the heated aqueous dispersion portion to the liquid phase 10 composed of the aqueous dispersion remaining in the evaporator to be circulated, may be mentioned the following various processes. A portion of the aqueous dispersion taken out of the evaporator 1 may be returned to the vapor phase 11 within the evaporator 1.

(i) A process in which the whole amount of the aqueous dispersion taken out of the evaporator 1 is heated in the external heat exchanger 2, and the heated aqueous dispersion is returned to the liquid phase 10 from the bottom of the evaporator 1 through the heated liquid phase-circulating line 4 and the line 15;

(ii) A process in which the whole amount of the aqueous dispersion taken out of the evaporator 1 is heated in the external heat exchanger 2, and the heated aqueous dispersion is divided into a portion through the heated liquid phase-circulating line 4 and a portion through the heated vapor phase-circulating line 3 to return them to the liquid phase 10 from the bottom of the evaporator 1 and to the vapor phase 11 from the top of the evaporator 1, respectively;

(iii) A process in which a part of the aqueous dispersion taken out of the evaporator 1 is heated in the external heat exchanger 2, the heated aqueous dispersion is returned to the liquid phase 10 from the bottom of the evaporator 1 through the heated liquid phase-circulating line 4 and the line 15, and at the same time the remainder of the aqueous dispersion taken out is returned to the liquid phase 10 from the bottom of the evaporator 1 through the non-heated liquid phase-circulating line 6 and the line 15 as it is not heated;

(iv) A process in which a part of the aqueous dispersion taken out of the evaporator 1 is heated in the external heat exchanger 2, the heated aqueous dispersion is returned to the liquid phase 10 from the bottom of the evaporator 1 through the heated liquid phase-circulating line 4 and the line 15, and at the same time the remainder of the aqueous dispersion taken out is returned to the vapor phase 11 from the top of the evaporator 1 through the non-heated vapor phase-circulating line 5 and the line 16 as it is not heated;

(v) A process in which a part of the aqueous dispersion taken out of the evaporator 1 is heated in the external heat exchanger 2, the heated aqueous dispersion is returned to the liquid phase 10 from the bottom of the evaporator 1 through the heated liquid phase-circulating line 4 and the line 15, and at the same time the remainder of the aqueous dispersion taken out is divided into a portion through the non-heated liquid phase-circulating line 6 and a portion through the non-heated vapor phase-circulating line 5 as it is not heated, to return them to the liquid phase 10 and to the vapor phase 11 within the evaporator 1, respectively;

(vi) A process in which a part of the aqueous dispersion taken out of the evaporator 1 is heated in the external heat exchanger 2, the heated aqueous dispersion is divided into a portion through the heated liquid phase-circulating line 4 and a portion through the heated vapor phase-circulating line 3 to return them to the liquid phase 10 and the vapor phase 11 within the evaporator 1, respectively, and at the same time the remainder of the aqueous dispersion taken out is returned to the liquid phase 10 from the bottom of the evaporator 1 through the non-heated liquid phase-circulating line 6 and the line 15 as it is not heated;

(vii) A process in which a part of the aqueous dispersion taken out of the evaporator 1 is heated in the external heat exchanger 2, the heated aqueous dispersion is divided into a portion through the heated liquid phase-circulating line 4 and a portion through the heated vapor phase-circulating line 3 to return them to the liquid phase 10 and to the vapor phase 11 within the evaporator 1, respectively, and at the same time the remainder of the aqueous dispersion taken out is returned to the vapor phase 11 from the top of the evaporator 1 through the non-heated vapor phase-circulating line 5 and the line 16 as it is not heated; and (viii) A process in which a part of the aqueous dispersion taken out of the evaporator 1 is heated in the external heat exchanger 2, the heated aqueous dispersion is divided into a portion through the heated liquid phase-circulating line 4 and a portion through the heated vapor phase-circulating line 3 to return them to the liquid phase 10 and the vapor phase 11 within the evaporator 1, respectively, and at the same time the remainder of the aqueous dispersion taken out is divided into a portion through the non-heated liquid phase-circulating line 6 and a portion through the non-heated vapor phase-circulating line 5 as it is not heated, to return them to the liquid phase 10 and to the vapor phase 11 within the evaporator 1, respectively.

Among these processes, the process (ii) or (iv) is preferred in that the volatile organic compounds can be efficiently removed. In this case, a proportion of the aqueous dispersion circulated to the liquid phase 10 and the vapor phase 11 is preferably 9/1 to 1/9, more preferably 8/2 to 2/8 in terms of a ratio of the liquid phase to the vapor phase.

Upon the use of the external heat exchanger 2, the temperature of the aqueous dispersion after heating is preferably set higher than the temperature of the aqueous dispersion making up the liquid phase within the evaporator 1. A difference in temperature between these aqueous dispersions is preferably higher than 0° C., but not higher than 50° C., more preferably higher than 0° C., but not higher than 20° C. If the temperature of the aqueous dispersion after the heating in the external heat exchanger 2 is raised too high for making the difference in temperature, the polymer particles tend to cause aggregation due to unstabilization of the aqueous dispersion upon circulation or injection into the evaporator. If the temperature of the aqueous dispersion after the heating in the external heat exchanger 2 is not very high on the other hand, it is necessary to lower the temperature of the aqueous dispersion within the evaporator 1 for making a difference in temperature. Therefore, the efficiency to remove the volatile organic compounds is markedly lowered.

No particular limitation is imposed of the form of the external heat exchanger 2. However, a plate type heat exchanger which is wide in contact area upon heating and capable of efficiently heating the aqueous dispersion even when the temperature of a heat medium used is low is preferred for the purpose of preventing aggregation or the like due to unstabilization of the aqueous dispersion upon heating or circulation.

With respect to the temperatures of the circulated liquid phase dispersion and the circulated vapor phase dispersion, it is preferred that the temperature of the liquid phase dispersion be made higher within a range higher than 0° C., but not higher than 20° C., preferably within a range higher than 0° C., but not higher than 10° C. than that of the vapor phase dispersion.

When the aqueous dispersion is returned to the vapor phase 11 to be circulated, it is preferred to inject (i.e., flush) the aqueous dispersion toward the lower part of the evaporator 1 from the upper part thereof, since the evaporation of the volatile organic compounds can be efficiently conducted while preventing level boiling of the liquid phase 10 within the evaporator 1. The flushing brings about an effect to mechanically prevent level boiling attendant on evaporation by the flushing of the aqueous dispersion from the upper part of the evaporator 1 to the liquid level.

In the stripping treatment under reduced pressure, concentration of the aqueous dispersion within the system is simultaneously conducted due to the evaporation and recovery of the aqueous dispersion and volatile organic compounds.

An aqueous medium can be newly added to the aqueous dispersion containing the polymer particles upon the stripping under reduced pressure. When the aqueous medium is added, the amount thereof is generally 1 to 200 vol %, preferably 5 to 100 vol % based on the aqueous medium. The new addition of the aqueous medium can prevents the concentration of the polymer particles in the aqueous dispersion by the stripping under reduced pressure from increasing to prevent occurrence of aggregate of the polymer particles and its adhesion to the inner wall of the evaporator. If the amount of the aqueous medium newly added is too little, the occurrence of aggregate of the polymer particles and its adhesion to the inner wall of the evaporator due to the concentration increase in the aqueous dispersion by the stripping under reduced pressure may occur prematurely in some cases. If amount of the aqueous medium newly added is too great, it takes a long time for steps such as washing and filtration after the stripping under reduced pressure. When a great amount of the aqueous medium is distilled off to adjust the amount of the aqueous dispersion in order to perform the post-treatment steps such as washing and filtration with good productivity, the efficiency of the stripping treatment under reduced pressure may be rather lowered in some cases.

In the stripping treatment of the aqueous dispersion containing the polymer particles under reduced pressure, the volatile organic compounds dissolved in the aqueous medium are generally removed together with the aqueous medium at high speed under control of vapor-liquid equilibrium in the initial stage of the treatment. In the final stage of the treatment, the dissolving-out of the volatile organic compound from the polymer particles into the aqueous medium becomes rate-determining, and the removal rate is lowered.

In the present invention, the quantity of heat supplied to the aqueous dispersion upon the stripping treatment of the aqueous dispersion containing the polymer particles under reduced pressure may be retained to a certain level to remove the volatile organic compounds together with the aqueous medium. In this case, the quantity of heat supplied per kg of the polymer particles upon the stripping treatment under reduced pressure is generally 5 to 200 kcal/hr, preferably 10 to 100 kcal/hr, and the treatment time varies according to the amount of the aqueous dispersion treated. However, the treatment time is generally of the order of 1 to 25 hours, preferably 3 to 30 hours, more preferably 5 to 15 hours from the initiation of the treatment. The time of initiation of the stripping treatment under reduced pressure means the time the interior of the evaporator has reached saturated water vapor pressure after heating the aqueous dispersion to the predetermined temperature.

In the production process according to the present invention, the quantity of heat supplied to the aqueous dispersion upon the stripping under reduced pressure may be increased step by step or continuously to remove the volatile organic compounds together with the aqueous medium. By this process, the removal rate of the volatile organic compounds in the initial stage of the treatment can be controlled to prevent bubbling of the aqueous dispersion. If the bubbling of the aqueous dispersion can be prevented, occurrence of aggregate of the polymer particles and lowering of the removal efficiency of the volatile organic compounds under vapor-liquid equilibrium can be prevented.

When the quantity of heat supplied is increased step by step or continuously, the quantity of heat supplied per kg of the polymer particles at the initial stage of the stripping treatment under reduced pressure is generally 5 to 50 kcal/hr, preferably 10 to 40 kcal/hr, and the initial treatment time is generally of the order of 0.1 to 5 hours, preferably 0.5 to 4 hours from the initiation of the treatment. The time of initiation of the stripping treatment under reduced pressure means the time the interior of the evaporator has reached saturated water vapor pressure after heating the aqueous dispersion to the predetermined temperature.

If the quantity of heat supplied at this stage is too little, the removal rate of the volatile organic compounds is slowed though the liquid level bubbling during the treatment is prevented, so that any efficient treatment may not be conducted in some cases. If the quantity of heat supplied is too great, difficulty may be encountered in some cases on the prevention of bubbling from the liquid level of the aqueous dispersion. If the treatment time in the above quantity of heat supplied is too short, difficulty may be encountered in some cases on the prevention of bubbling from the liquid level. If the time is too long on the other hand, the removal rate of the volatile organic compounds is slowed, so that any efficient treatment may not be conducted in some cases.

The quantity of heat supplied per kg of the polymer particles at the final stage of the stripping treatment under reduced pressure is generally 20 to 200 kcal/hr, preferably 30 to 100 kcal/hr. If this quantity of heat supplied is too little, the removal rate of the volatile organic compounds is slowed, so that any efficient treatment may not be conducted in some cases. If the quantity of heat supplied is too great on the other hand, the quantity of evaporation becomes great, and difficulty may be encountered in some cases on the prevention of bubbling from the liquid level. The treatment time at the final stage of the stripping treatment under reduced pressure is generally 0.5 to 20 hours, preferably 1 to 15 hours.

When the quantity of heat supplied upon the stripping under reduced pressure is increased step by step or continuously, it is desirable that the quantity of heat supplied per kg of the polymer particles at the final stage of the stripping treatment under reduced pressure be more increased by generally at least 3 kcal/hr, preferably at least 5 kcal/hr than the quantity of heat supplied per kg of the polymer particles at the initial stage of the stripping treatment under reduced pressure.

Methods for increasing the quantity of heat supplied include a method making use of the evaporator 1 to which the external heat exchanger 2 is connected, and besides a method making use of the evaporator 1 provided with the heat medium-circulating jacket 7, a method making use of an evaporator provided with a heat exchanger in its interior, a method of blowing a heated gas into an evaporator through the gas-blowing line 8, and a method combining these methods with one another. Among these methods, the method combining the method making use of the evaporator 1, to which the external heat exchanger 2 is connected, with the method of blowing a heated gas into the evaporator 1 is preferred from the viewpoint of reconciling both removal rate and prevention of bubbling.

In the stripping under reduced pressure, it is preferred that the temperature Ts (°C.) of the aqueous dispersion containing the polymer particles be controlled to not lower than the glass transition temperature Tg (°C.) of the polymer particles, but lower than 100° C., namely, satisfy the relationship Tg$\leq$Ts<100° C. The temperature Ts of the aqueous dispersion more preferably satisfies the relationship Tg$\leq$Ts$\leq$90° C., particularly preferably the relationship Tg+5° C.$\leq$Ts$\leq$85° C. If the temperature Ts of the aqueous dispersion upon the stripping under reduced pressure is lower than the glass transition temperature Tg of the polymer particles, the quantity of evaporation becomes little, and moreover the migration of the volatile organic compounds in the polymer particles is extremely slowed, so that the removal rate of the volatile organic compounds is markedly lowered. From this point of view, it is desirable that the temperature Ts of the aqueous dispersion be preset higher by at least 5° C. than the glass transition temperature Tg of the polymer particles. If the temperature Ts of the aqueous dispersion is higher than 100° C. on the other hand, the dispersion stability of the polymer particles is deteriorated by heat, so that aggregate of the polymer particles occurs during the treatment, or adhesion of scale to the wall of the evaporator and the stirrer increases.

When the external heat exchanger is used, the temperature of the aqueous dispersion making up the liquid phase within the evaporator may be gradually heated during repeated flushing under reduced pressure while circulating the aqueous dispersion medium between the evaporator and the external heat exchanger, so as to reach the above-described temperature range. However, the temperature of the aqueous dispersion may be raised to the above-described range in advance, and the flushing under reduced pressure may be then initiated.

When the binder resin (polymer component) formed by the polymerization of the polymerizable monomer has at least two glass transition temperatures Tg, the temperature of the aqueous dispersion upon flushing under reduced pressure is adjusted on the basis of the lowest Tg. The glass transition temperature Tg of the polymer particles is a value measured by a differential scanning calorimeter (DSC).

Although the dispersing agent used upon the polymerization is present in the aqueous dispersion containing the polymer particles, an additional dispersing agent may be added for the purpose of maintaining the dispersion stability upon the stripping treatment under reduced pressure.

The end point of the stripping treatment under reduced pressure is a point of time the content of the residual polymerizable monomer in the polymer particles has reached the desired level or lower. Specifically, the stripping treatment under reduced pressure is conducted in such a manner that the content of the residual polymerizable monomer in the polymer particles (polymerized toner) after drying amounts to, preferably at most 80 ppm, more preferably at most 70 ppm, from the viewpoint of odor or the like during printing making use of the resulting polymerized toner. Since the content of the residual polymerizable monomer in the polymer particles is also decreased in the drying step, the content of the residual polymerizable monomer in the polymer particles after the stripping under reduced pressure and before the drying is preferably controlled to at most 100 ppm.

The content of the residual polymerizable monomer in the polymer particles is measured every hour during the stripping treatment to plot the content (y) of the residual polymerizable monomer against the treatment time (x). Linear relationship is achieved between the treatment time (x) and the content (y) of the residual polymerizable monomer by making a semilogarithmic graph in which a y-axis is indicated as logarithm. An exponential approximate expression, $y = a \cdot e^{-bx}$ may be obtained on the basis of this plot. A reduction speed Rs (%/hr) of the residual polymerizable monomer can be calculated out in accordance with the following equation from this exponential approximate expression.

$$Rs = 100 \times (1 - e^{-b})$$

The reduction speed Rs (%/hr) of the residual polymerizable monomer is preferably at least 10%/hr. If this value is too small, the removal rate of the residual polymerizable monomer is too slow, so that it is difficult to conduct an efficient treatment.

The pressure within the evaporator is determined according to the relationship between the treatment time and the vapor pressure of the aqueous medium (generally, water). In the present invention, however, the pressure within the evaporator is preferably controlled within a range of 11 to 71 kPa in terms of absolute pressure (a range of −30 to −90 kPa in terms of gauge pressure). If the pressure within the evaporator is too high, the aqueous dispersion is required to be heated to a considerably high temperature, so that the dispersion stability of the polymer particles in the aqueous dispersion in the external heat exchanger is deteriorated, and occurrence of aggregate of the polymer particles and adhesion of scale to the inner wall of the evaporator increase during the treatment. If the pressure within the evaporator is too low, the pressure becomes too low against the vapor pressure if the aqueous medium at the treatment temperature, so that the vapor-liquid equilibrium shifts to the vapor side at a stretch, and boiling of the aqueous medium and volatile organic compounds from the interior of the aqueous dispersion begins to markedly cause bubbling. Therefore, it is difficult to stably conduct the treatment.

In the present invention, in order to facilitate the renewal of the interface between the polymer particles and the aqueous medium in the aqueous dispersion to promote evaporation of the volatile organic compounds, the stripping treatment under reduced pressure may be conducted while blowing a gas into the liquid phase within the evaporator within limits not unstabilizing balance between the temperature and the pressure in the system. No particular limitation is imposed on the gas blown. It is preferably incombustible gas such as water vapor, dry air, nitrogen, argon, helium and carbon dioxide. When the gas is blown, it is preferred that the temperature of the gas be controlled to at most 100° C. for the purpose of preventing the aggregation of the polymer particles.

In the present invention, after the stripping treatment under reduced pressure, the polymer particles may be aggregated, as needed, to enlarge the particle diameter, and then subjected to dewatering, washing and drying treatments, thereby obtaining dry polymer particles (dry polymerized toner). The content of the residual polymerizable monomer in the resultant dry polymer particles is preferably at most 80 ppm, more preferably at most 70 ppm.

IV. Polymerized Toner

The polymerized toner obtained by the production process according to the present invention contains the residual polymerizable monomer in an amount as extremely low as preferably at most 80 ppm, more preferably at most 70 ppm, often at most 65 ppm. The content of the residual polymerizable monomer can be reduced to lower than 20 ppm. In many cases, a polymerized toner which does not emit an offensive odor upon its fixing can be obtained when the content of the residual polymerizable monomer is of the order of 20 to 80 ppm.

The polymerized toner obtained by the production process according to the present invention has excellent properties though it has been subjected to the stripping treatment under reduced pressure.

The polymerized toner according to the present invention is excellent in flowability because it is not aggregated by virtue of the stripping treatment under reduced pressure. The flowability can be determined in the following manner. Sieves having sieve openings of 150 μm, 75 μm and 45 μm, respectively, are laid on top of another in that order from above, and a polymerized toner sample (4 g) is put on the uppermost sieve. The three kinds of sieves are then vibrated for 15 seconds by means of a powder measuring device (manufactured by Hosokawa Micron Corporation) under conditions of vibration intensity of 4. Thereafter, the weight of the polymerized toner captured on each sieve was measured and substituted into its corresponding equation (i), (ii) or (iii) shown below, thereby finding the value of a, b and c. These values were substituted into the equation (iv) to calculate out the value of flowability.

$a = $[(weight (g) of the polymerized toner remaining on the sieve of 150 μm)/4 g]×100     (i)

$b = $[(weight (g) of the polymerized toner remaining on the sieve of 75 μm)/4 g]×100     (ii)

$c = $[(weight (g) of the polymerized toner remaining on the sieve of 45 μm)/4 g]×100     (iii)

Flowability (%) = 100 − (a+b+c).     (iv)

The polymerized toner obtained by the production process according to the present invention has flowability of generally at least 55%, preferably at least 60%.

The volume average particle diameter (Dv) of the polymerized toner according to the present is generally 3 to 15 μm, preferably 5 to 10 μm. A ratio (Dv/Dp) of the volume average particle diameter (Dv) to the number average particle diameter (Dp) of the polymerized toner according to the present invention is generally 1 to 1.40, preferably 1 to 1.31, and so the polymerized toner has a sharp particle diameter distribution. In the polymerized toner according to the present invention, a value (Sc/Sr) obtained by dividing an area (Sc) of a circle supposing that the absolute maximum length of particles is a diameter by a substantial projected area (Sr) of the particles falls within a range of 1 to 1.3. The polymerized toner is thus substantially spherical. The polymerized toner according to the present invention is preferably such that a product (A×Dp×D) of the BET specific surface area (A) (m²/g), the number average particle diameter (Dp) (μm) and the true specific gravity (D) falls within a range of 5 to 10.

The polymerized toner according to the present invention has a melt viscosity of preferably at most 100,000 poises, more preferably 0.1 to 100,000 poises, particularly preferably 1 to 80,000 poises as measured at 120° C. The viscosity measurement may be conducted by means of a flow tester. The use of the polymerized toner having such a melt viscosity is preferred because high image quality can be realized even in high-speed printing.

When the polymerized toner according to the present invention is composed of polymer particles of a core·shell structure, i.e., a capsule toner, it is preferred that the glass transition temperature of a polymer component forming core particles be made lower than that of a polymer component forming a polymer layer (shell) covering each of surfaces of the core particles. The glass transition temperatures of their corresponding polymer components between core and shell are adjusted, whereby the resulting polymerized toner can be balanced between low-temperature fixing ability and shelf stability at a high level. More specifically, the low-temperature fixing ability is improved by the core particles containing having a lower glass transition temperature, and on the other hand the aggregation among polymerized toner particles during storage can be prevented by the thin polymer layer (shell) composed of a polymer component having a higher glass transition temperature.

In the polymerized toner according to the present invention, the charging property, flowability, shelf stability, etc. can be generally adjusted by subjecting it to a treatment with additives to cause the additives (hereinafter referred to as "external additives") to adhere to or embed into the surfaces of the polymer particles (polymerized toner particles).

As the external additives, may be mentioned inorganic particles and organic resin particles. However, silica particles and titanium oxide particles are preferred, with silica particles subjected to a hydrophobicity-imparting treatment being particularly preferred. In order to cause the external additives to adhere to the polymerized toner, it is generally only necessary to charge the external additives and the polymerized toner particles into a mixer such as a Henschel mixer to mix them under stirring.

ADVANTAGES OF THE INVENTION

According to the production process of the present invention, there is a polymerized toner which is markedly reduced in the content of a residual polymerizable monomer, prevented from emitting offensive odor upon fixing of the toner and excellent in environmental safety. The use of the polymerized toner according to the present invention can realize continuous high-speed printing in a state that influence of odor on environment has been lessened.

EMBODIMENTS OF THE INVENTION

The present invention will hereinafter be described more specifically by the following examples and comparative examples. However, the present invention is not limited to these examples only. Incidentally, all designations of "part" or "parts" and "%" as will be used in the following examples mean part or parts by weight and % by weight unless expressly noted. Physical properties and properties or characteristics were evaluated in accordance with the following respective methods.

(1) Bubbling Tendency on Liquid Level

The condition of the liquid level within an evaporator was visually observed to evaluate the bubbling tendency on the liquid level in accordance with the following standard:

A: Stable treatment state that retention of bubbles was scarcely observed on the liquid level of an aqueous dispersion, or only some bubble layer was formed;

B: A unstable treatment state that retention of bubbles was always observed on the liquid level of an aqueous dispersion, and the bubbles varied within a range not reached an exhaust line at the upper part of an evaporator;

C: A state that bubbles greatly grew to an extent that the bubbles reached the exhaust line at the upper part of the evaporator, and any continuous treatment may not be conducted due to the unstable interior of the evaporator.

(2) Particle Diameter

The volume average particle diameter (Dv) and particle diameter distribution represented by a ratio (Dv/Dp) of volume average particle diameter (Dv) to number average particle diameter (Dp) of each polymer particle sample (polymerized toner sample) were measured by means of a Multisizer (manufactured by Beckmann Coulter Co.). The measurement by the Multisizer was conducted under the following conditions:

aperture diameter: 100 $\mu$m;

medium: Isothone II, concentration: 10%; and number of particles measured: 100,000 particles.

(3) Glass Transition Temperature

A differential scanning calorimeter (SSC5200, manufactured by Seiko Instruments Inc.) was used to measure the glass transition temperature of each polymer particle sample in accordance with ASTM D 3418-97. More specifically, a polymerized toner sample (about 10 mg) was precisely weighed and put into an aluminum pan. A vacant aluminum pan was used as a reference, and a temperature range for measurement was determined to be from room temperature to 150° C. to measure the glass transition temperature at a heating rate of 10° C./min under normal temperature and normal humidity.

(4) Content of Residual Polymerizable Monomer

Gas chromatography was used to measure the content of a residual polymerizable monomer in a polymer particle sample (polymerized toner sample) in accordance with the following conditions and method.

Column: TC-WAX, 0.25 mm×30 mm

Column temperature: 80° C.

Injection temperature: 200° C.

FID detection side temperature: 200° C.

About 3 grams of a wet polymer particle sample before drying or a polymer particle sample after drying were precisely weighed to mg unit, and N,N-dimethyl-formamide (27 g) was added to stir the resultant mixture for 15 minutes. After methanol (13 g) was then added, and the mixture was stirred for additional 10 minutes, the mixture was left at rest to precipitate insoluble matter. Thereafter, a supernatant (2 $\mu$l) was poured into a gas chromatograph to identify the content of a polymerizable monomer. An N,N-dimethylformamide/methanol solution of each polymerizable monomer was used as a standard sample for determination.

After dewatering, the content of the residual polymerizable monomer in the polymer particles before drying was calculated out as a ratio to pure solids in the wet sample. The pure solids were found by (i) precisely weighing about 1 g of the wet polymer particles to mg unit at the same time as taking out the wet polymer particles for operation of the sample preparation, (ii) heating and drying the polymer particles at about 200° C. for 30 minutes by an infrared lamp and then precisely weighing the weight of the dry polymer particles, (iii) calculating a proportion of the pure solids from a difference in weight between before and after drying, and (iv) multiplying this proportion by the weight of the wet polymer particles used for the determination of the content of the residual polymerizable monomer.

The content of the residual polymerizable monomer in the polymer particles after drying was calculated out as a ratio to the weight of said polymer particles.

(5) Calculation Method of Reduction Speed Rs (%/hr) of Residual Polymerizable Monomer The content of the residual polymerizable monomer in the polymer particles was measured in accordance with the above-described method every hour during the stripping treatment to plot the content (y) of the residual polymerizable monomer against the treatment time (x). A semilogarithmic graph in which a y-axis is indicated as logarithm was made, whereby linear relationship is achieved between the treatment time (x) and the content (y) of the residual polymerizable monomer. An exponential approximate expression, $y=a\cdot e^{-bx}$ was obtained on the basis of this plot. A reduction speed Rs (%/hr) of the residual polymerizable monomer was calculated out in accordance with the following equation from this exponential approximate expression.

$$Rs=100\times(1-e^{-b})$$

(6) Evaluation of Odor

A polymerized toner sample was used to conduct continuous printing by means of a commercially available printer (printing speed: 4 sheets/min). With respect to odor of the polymerizable monomer in the vicinity of the exit of the printed paper close to a fixing means, an organoleptic test by 5 healthy adults was conducted to evaluate the sample as to odor in accordance with the following standard:

A: No person felt odor of the polymerizable monomer;

B: One or two persons felt odor of the polymerizable monomer;

C: At least 3 persons felt odor of the polymerizable monomer.

EXAMPLE 1

1. Preparation Step of Polymerizable Monomer Composition for Core

A polymerizable monomer mixture (Tg of the copolymer obtained by copolymerization=55° C.) for core composed of 80.5 parts of styrene and 19.5 parts of n-butyl acrylate, 0.3 parts of a polymethacrylic ester macromonomer ("AA6", trade name; Tg: 94° C.; product of Toagosei Chemical Industry Co., Ltd.), 0.5 parts of divinylbenzene, 1.2 parts of t-dodecylmercaptan, 7 parts of carbon black ("#25B", trade name; product of Mitsubishi Kagaku Co., Ltd.), 1 part of a charge control agent ("Spiron Black TRH", trade name; product of Hodogaya Chemical Co., Ltd.) and 2 parts of a parting agent ("Paraflint H1", trade name; Fischer-Tropsch wax produced by Sutherl Co.; endothermic peak temperature=100° C.) were subjected to wet grinding by means of a media type wet grinding machine to prepare a polymerizable monomer composition for core.

2. Preparation Step of Aqueous Dispersion Medium

An aqueous solution with 6.2 parts of sodium hydroxide (alkali metal hydroxide;) dissolved in 50 parts of ion-exchanged water was gradually added to an aqueous solution with 10.2 parts of magnesium chloride (water-soluble polyvalent metallic salt) dissolved in 250 parts of ion-exchanged water under stirring to prepare a dispersion of magnesium hydroxide colloid (colloid of hardly water-soluble metal hydroxide). The particle diameter distribution of the colloid formed was measured by means of a microtrack particle diameter distribution measuring device (manufactured by Nikkiso Co., Ltd.) and found to be 0.35 $\mu$m in terms of $D_{50}$ (50% cumulative value of number particle diameter distribution) and 0.84 $\mu$m in terms of $D_{90}$ (90% cumulative value of number particle diameter distribution). The measurement by means of the microtrack particle diameter distribution measuring device was performed under the following conditions:

measuring range: 0.12 to 704 $\mu$m;

measuring time: 30 seconds; and medium: ion-exchanged water.

3. Preparation of Polymerizable Monomer for Shell

Three parts of methyl methacrylate (Tg–105° C.) and 100 parts of water were subjected to a finely dispersing treatment by an ultrasonic emulsifier to obtain an aqueous dispersion of a polymerizable monomer for shell. The droplet diameter of droplets of the polymerizable monomer for shell was found to be 1.6 $\mu$m in terms of $D_{90}$ as determined by means of the microtrack particle diameter distribution measuring device by adding the droplets thus obtained at a concentration of 3% to a 1% aqueous solution of sodium hexametaphosphate.

4. Droplet-Forming Step of Polymerizable Monomer Composition

The monomer composition for core obtained in the step 1 was poured into the colloidal dispersion of magnesium hydroxide obtained in the step 2, the mixture was stirred until droplets became stable, and 6 parts of t-butyl peroxy-2-ethylhexanoate ("Perbutyl O", trade name, product of Nippon Oil & Fats Co., Ltd.) was added as a polymerization initiator thereto. Thereafter, the resultant dispersion was stirred 30 minutes at 15,000 rpm under high shearing force by means of a Ebara Milder to form droplets of the polymerizable monomer composition.

5. Suspension Polymerization Step

A reactor equipped with a stirrer was charged with the aqueous dispersion of the polymerizable monomer subjected to the droplet-forming step 4 to initiate a polymerization reaction at 85° C. After a conversion into a polymer reached almost 100%, a dispersion of the aqueous dispersion of the polymerizable monomer for shell prepared in the step 3, in which 0.3 parts of a water-soluble initiator [2,2'-azobis(2-methyl-N-(2-hydroxyethyl)-propionamide); "VA-086", trade name; product of Wako Pure Chemical Industries, Ltd.] had been dissolved, was charged into the reactor. After the reaction was continued for 4 hours, the reaction was stopped to obtain an aqueous dispersion of polymer particles having a core·shell structure.

6. Stripping Step Under Reduced Pressure

An evaporator 1 equipped with a stirrer 17 as illustrated in FIG. 1 was charged with the aqueous dispersion of the polymer particles obtained in the step 5. While stirring the aqueous dispersion, it was circulated between the evaporator 1 and a plate type external heat exchanger 2. The aqueous dispersion taken out of the evaporator 1 was heated in the external heat exchanger 2 to heat a water phase 10 to 70° C. At this time, 70% of the whole amount of the aqueous dispersion circulated from the external heat exchanger to the evaporator was injected within the water phase 10 from the bottom of the evaporator 1 through a heated liquid phase-circulating line 4 and a line 15, and the remainder, i.e., 30% of the whole amount, was injected within a vapor phase 11 toward the liquid level of the water phase 10 from the top of the evaporator 1 through a heated vapor phase-circulating line 3 and a line 16. Namely, a circulating ratio of the liquid phase/the vapor phase was adjusted to 70/30.

Thereafter, the pressure within the evaporator was reduced to 39 kPa in terms of absolute pressure (−62 kPa in terms of gauge pressure). Further, the aqueous dispersion taken out of the evaporator 1 was heated in the external heat exchanger 2 to control the temperature in such a manner that the temperature of the aqueous dispersion heated was 78° C., and the temperature of the liquid phase 10 within the evaporator 1 was 74° C. At this time, the quantity of heat supplied was controlled to 32 kcal/hr per kg of the polymer particles, thereby evaporating volatile organic compounds and the aqueous medium (water) in an amount corresponding to the quantity of heat supplied to be discharged through an exhaust line 9. While retaining these conditions, stripping under reduced pressure was conducted for 10 hours. Thereafter, the supply of heat was stopped, the pressure reduced was returned, and the aqueous dispersion (liquid phase) remaining in the evaporator 1 was cooled to 25° C.

The aqueous dispersion was sampled every hour during the stripping treatment under reduced pressure to measure the content of the residual polymerizable monomer in the polymer particles. After the stripping under reduced pressure, neither increase of aggregate in the aqueous dispersion remaining in the evaporator 1 nor adhesion of scale to the interior of the evaporator and the external heat exchanger was observed.

7. Post-treatment Step

The aqueous dispersion containing the polymer particles of the core-shell structure obtained above was washed (at 25° C. for 10 minutes) with sulfuric acid under stirring to adjust the pH to 4.5 or lower, thereby dissolving the magnesium hydroxide colloid. This aqueous dispersion was filtered, and dewatered and washed by means of a continuous belt filter ("Eagle Filter" trade name, manufactured by Sumitomo Heavy Industries, Ltd.) to filter and separate solids. Thereafter, the solids collected were dried at 45° C. for 10 hours by a dryer to obtain polymer particles (dry polymerized toner) of a core-shell structure. The contents of the residual polymerizable monomer in the polymer particles before and after drying by the dryer were measured.

8. Developer liquid phase returned) of the aqueous dispersion circulated from the external heat exchanger within the evaporator through the heated liquid phase-circulating line 4, the temperature (temperature of the vapor phase returned) of the aqueous dispersion circulated through the heated vapor phase-circulating line 3, the circulating ratio of the liquid phase to the vapor phase, the quantity of heat supplied, the pressure within the evaporator, and the treatment time of the stripping under reduced pressure were preset as shown in Table 1. The results are shown in Table 1.

COMPARATIVE EXAMPLE 1

A polymerized toner and a non-magnetic one-component developer were produced in the same manner as in Example 1 except that a stripping treatment under reduced pressure was performed by conducting only steam supply to the liquid phase from the gas-blowing line 8 located at the lower part of the evaporator 1 without circulating the aqueous dispersion by means of the plate type external heat exchanger 2, the quantity of heat supplied at the time the stripping was started was changed to 29 kcal/hr per kg of the polymer particles, and the stripping under reduced pressure was conducted for 12 hours. After completion of the stripping under reduced pressure, increase of aggregate in the aqueous dispersion and adhesion of scale to the interior of the evaporator and the external heat exchanger were observed. The results are shown in Table 1.

TABLE 1

|  | Example | | | | Comp. Ex. |
| --- | --- | --- | --- | --- | --- |
|  | 1 | 2 | 3 | 4 | 1 |
| Treatment conditions | | | | | |
| Liquid temp. in evaporator (° C.) | 74 | 74 | 74 | 78 | 75 |
| Temp. of liquid phase returned (° C.) | 78 | 78 | 78 | 80 | 76 |
| Temp. of vapor phase returned (° C.) | 78 | 78 | 74 | 80 | — |
| Pressure in evaporator (kPa) | 39 | 39 | 39 | 43 | 39 |
| Quantity of heat supplied (kcal/hr · kg) | 32 | 36 | 43 | 36 | 29 |
| Treatment time (hr) | 10 | 12 | 8 | 8 | 12 |
| Circulating ratio of liquid phase/vapor phase | 70/30 | 50/50 | 30/70 | 70/30 | — |
| Treatment state | | | | | |
| Bubbling tendency on liquid level | A | A | A | A | C |
| Reduction speed of residual monomer (%/hr) | 18 | 19 | 21 | 20 | 10 |
| Property of polymerized toner | | | | | |
| Dv (μm) | 7.6 | 7.4 | 7.5 | 4.6 | 7.6 |
| Dv/Dn | 1.28 | 1.29 | 1.30 | 1.30 | 1.32 |
| Tg (° C.) | 55 | 56 | 55 | 55 | 55 |
| Content of residual monomer in dry polymerized toner (ppm) | 46 | 29 | 55 | 60 | 105 |
| Odor upon fixing | A | A | A | A | B |

To 100 parts of the polymer particles (polymerized toner particles) obtained above were added 0.8 parts of silica ("RX200", trade name; product of Nippon Aerosil Co., Ltd.) having an average particle diameter of 14 nm subjected to a hydrophobicity-imparting treatment, and they were mixed by means of a Henschel mixer to prepare a non-magnetic one-component developer for electrophotography. The results are shown in Table 1.

EXAMPLES 2 to 4

Polymerized toners and non-magnetic one-component developers were produced in the same manner as in Example 1 except that the temperature (temperature of the The following facts are known from the results shown in Table 1.

According to the process (Examples 1 to 4) of the present invention, the stripping treatment under reduced pressure can be conducted with high removal efficiency of the residual polymerizable monomer without any problem of bubbling on a liquid level. As a result, polymerized toners low in the content of the residual polymerizable monomer and free of offensive odor upon fixing can be provided.

On the other hand, in the case where no circulation of the aqueous dispersion making use of the external heat exchanger is conducted (Comparative Example 1), bubbling occurs on the liquid level during the stripping treatment under reduced pressure, and so the treatment cannot be stably conducted. Therefore, the quantity of heat supplied can be fully increased. As a result, the removal efficiency of the residual polymerizable monomer becomes insufficient, so that only a polymerized toner that offers a problem of odor upon fixing can be provided.

EXAMPLE 5

An aqueous dispersion containing polymer particles formed was prepared in the same manner as in Steps 1 to 5 of Example 1.

(I) Stripping Step Under Reduced Pressure

An evaporator 1 equipped with a stirrer 17 as illustrated in FIG. 1 was charged with the aqueous dispersion of the polymer particles obtained above. While stirring the aqueous dispersion, it was circulated between the evaporator 1 and a plate type external heat exchanger 2. The aqueous dispersion taken out of the evaporator 1 was heated in the external heat exchanger 2 to heat a water phase 10 to 70° C.

Thereafter, the pressure within the evaporator was reduced to 39 kPa in terms of absolute pressure (−62 kPa in terms of gauge pressure). Further, the aqueous dispersion taken out of the evaporator 1 was heated in the external heat exchanger 2, and the heated aqueous dispersion was circulated to the liquid phase 10 in the evaporator 1, and at the same time steam was supplied into the liquid phase 10 through the gas-blowing line 8 located at the bottom of the evaporator 1 to control the temperature of the aqueous dispersion (liquid phase) within the evaporator 1 to 76° C., thereby starting stripping under reduced pressure.

The quantity of heat supplied from the external heat exchanger and the steam from the starting of the treatment to the elapsed time of 3 hours was controlled to 36 kcal/hr per kg of the polymer particles (Stage 1). Thereafter, the quantity of heat supplied was increased to 55 kcal/hr to successively conduct the stripping under reduced pressure for 5 hours (Stage 2). By this treatment, the quantity of heat supplied was increased step by step to conduct the stripping treatment under reduced pressure for 8 hours in total. During the treatment, volatile organic compounds and the aqueous medium (water) were evaporated in an amount corresponding to the quantity of heat supplied to be discharged through an exhaust line 9. After completion of the stripping under reduced pressure, the supply of heat was stopped, the pressure reduced was returned, and the aqueous dispersion remaining in the evaporator 1 was cooled to 25° C.

The aqueous dispersion was sampled every hour during the stripping treatment under reduced pressure to measure the content of the residual polymerizable monomer in the polymer particles. After the stripping under reduced pressure, neither increase of aggregate in the aqueous dispersion nor adhesion of scale to the interior of the evaporator and the external heat exchanger was observed.

(II) Post-Treatment Step

The aqueous dispersion containing the polymer particles of the core-shell structure obtained above was washed (at 25° C. for 10 minutes) with sulfuric acid under stirring to adjust the pH to 4.5 or lower, thereby dissolving the magnesium hydroxide colloid. This aqueous dispersion was filtered, and dewatered and washed by means of a continuous belt filter ("Eagle Filter" trade name, manufactured by Sumitomo Heavy Industries, Ltd.) to filter and separate solids. Thereafter, the solids collected were dried at 45° C. for 10 hours by a dryer to obtain polymer particles (dry polymerized toner) of a core-shell structure. The contents of the residual polymerizable monomer in the polymer particles before and after drying by the dryer were measured.

(III) Developer

To 100 parts of the polymer particles obtained above were added 0.8 parts of silica ("RX200", trade name; product of Nippon Aerosil Co., Ltd.) having an average particle diameter of 14 nm subjected to a hydrophobicity-imparting treatment, and they were mixed by means of a Henschel mixer to prepare a non-magnetic one-component developer for electrophotography. The results are shown in Table 2.

EXAMPLES 6 to 8

Polymerized toners and non-magnetic one-component developers were produced in the same manner as in Example 5 except that the quantity of heat supplied, and the treatment time were changed as shown in Table 2. The results are shown in Table 2.

COMPARATIVE EXAMPLE 2

A stripping treatment under reduced pressure was performed by conducting only steam supply from the bottom of the evaporator 1 without using the plate type external heat exchanger 2. The quantity of heat supplied at the time the stripping was started was controlled to 55 kcal/hr per kg of the polymer particles to start the stripping treatment under reduced pressure. However, bubbling vigorously occurred on the liquid level of the aqueous dispersion to fail to operate the treatment. Therefore, the supply of heat was stopped, the pressure reduced was returned to stop the stripping treatment under reduced pressure. The aqueous dispersion was cooled to 25° C. After completion of the stripping under reduced pressure, increase of aggregate in the aqueous dispersion and adhesion of scale to the interior of the evaporator and the external heat exchanger were observed. In the same manner as in Example 5, the polymer particles were recovered from the aqueous dispersion, and dried, and a non-magnetic one-component developer was produced. The results are shown in Table 2.

COMPARATIVE EXAMPLE 3

A polymerized toner and a non-magnetic one-component developer were produced in the same manner as in Example 5 except that the quantity of heat supplied, and the treatment time were changed as shown in Table 2, and the stripping treatment under reduced pressure was conducted by one stage. The results are shown in Table 2.

TABLE 2

|  | Example | | | | Comp. Ex. | |
| --- | --- | --- | --- | --- | --- | --- |
|  | 5 | 6 | 7 | 8 | 2 | 3 |
| Treatment conditions | | | | | | |
| Liquid temp. in evaporator (° C.) | 76 | 76 | 76 | 76 | 76 | 76 |
| Liquid temp. after heating (° C.) | 80 | 80 | 78 | 78 | 76 | 78 |
| Pressure in evaporator (kPa) | 39 | 39 | 39 | 39 | 39 | 39 |
| Stage 1: | | | | | | |

TABLE 2-continued

|  | Example | | | | Comp. Ex. | |
| --- | --- | --- | --- | --- | --- | --- |
|  | 5 | 6 | 7 | 8 | 2 | 3 |
| Quantity of heat supplied (kcal/hr · kg) | 36 | 36 | 29 | 29 | 55 | 29 |
| Treatment time (hr) | 3 | 3 | 3 | 2 | Stop | 12 |
| Stage 2: |  |  |  |  |  |  |
| Quantity of heat supplied (kcal/hr · kg) | 55 | 43 | 36 | 36 | — | — |
| Treatment time (hr) | 5 | 7 | 8 | 10 | — | — |
| Treatment state |  |  |  |  |  |  |
| Bubbling tendency on liquid level | A | A | A | A | C | A |
| Reduction speed of residual monomer (%/hr) | 27 | 18 | 17 | 16 | — | 8 |
| Property of polymerized toner |  |  |  |  |  |  |
| Dv ($\mu$m) | 7.5 | 7.4 | 7.5 | 7.5 | 7.6 | 7.5 |
| Dv/Dn | 1.30 | 1.30 | 1.31 | 1.30 | 1.33 | 1.31 |
| Tg (° C.) | 55 | 55 | 55 | 55 | 55 | 54 |
| Content of residual monomer in dry polymerized toner (ppm) | 45 | 45 | 64 | 55 | 250 | 125 |
| Odor upon fixing | A | A | A | A | C | C |

The following facts are known from the results shown in Table 2.

According to the process (Examples 5 to 8) of the present invention, the stripping treatment under reduced pressure can be conducted with high removal efficiency of the residual polymerizable monomer without any problem of bubbling on a liquid level. As a result, polymerized toners low in the content of the residual polymerizable monomer and free of offensive odor upon fixing can be provided with ease.

On the other hand, in Comparative Example 2, bubbling vigorously occurs in the aqueous dispersion during the stripping treatment under reduced pressure, and so the treatment cannot be stably conducted. As a result, only a polymerized toner that is insufficient in removal of the residual polymerizable monomer and offers a problem of odor upon fixing can be provided. In Comparative Example 3, no problem as to bubbling arises. However, since the quantity of heat supplied is small, only a polymerized toner that is insufficient in removal of the residual polymerizable monomer and offers a problem of odor upon fixing can be provided.

What is claimed is:

1. A process for producing a polymerized toner, comprising the step of polymerizing a polymerizable monomer composition containing at least a polymerizable monomer and a colorant in an aqueous medium, wherein an aqueous dispersion containing formed polymer particles is subjected to stripping under reduced pressure in an evaporator after polymerization, and at this time the aqueous dispersion within the evaporator is continuously taken out of the evaporator and heated in an external heat exchanger, and the heated aqueous dispersion is returned to a liquid phase within the evaporator and subjected to stripping under reduced pressure within the evaporator while circulating the aqueous dispersion, thereby distilling off volatile organic compounds, and wherein polymer particles containing a residual polymerizable monomer in a proportion of at most 100 ppm are recovered from the dispersion remaining in the evaporator.

2. The production process according to claim 1, wherein the stripping of the aqueous dispersion containing the polymer particles formed under reduced pressure is executed in accordance with the following steps:
  (1) the step of pouring the aqueous dispersion containing the polymer particles formed into an evaporator after polymerization;
  (2) the step of taking the poured aqueous dispersion out of the evaporator to lead it to an external heat exchanger, and returning the aqueous dispersion heated in the heat exchanger to the liquid phase composed of the aqueous dispersion remaining in the evaporator; and
  (3) the step of continuously conducting the step (2) repeatedly, thereby subjecting the aqueous dispersion to stripping under reduced pressure within the evaporator while circulating the aqueous dispersion between the evaporator and the external heat exchanger, to distill off volatile organic compounds together with a part of the aqueous medium, and the polymer particles are obtained by
  (4) the step of recovering the polymer particles from the aqueous dispersion remaining in the evaporator.

3. The production process according to claim 2, wherein in the step (2), the whole amount of the aqueous dispersion taken out of the evaporator is led to and heated in the external heat exchanger, and the heated aqueous dispersion is divided into a portion through the heated liquid phase-circulating line and a portion through the heated vapor phase-circulating line to return them to the liquid phase composed of the aqueous dispersion remaining in the evaporator from the heated liquid phase-circulating line and to the vapor phase above the liquid phase from the heated vapor phase-circulating line.

4. The production process according to claim 3, wherein a proportion circulating the aqueous dispersion heated in the external heat exchanger to the liquid phase and the vapor phase falls within a range of 9:1 to 1:9.

5. The production process according to claim 3, wherein upon returning the aqueous dispersion heated in the external heat exchanger to the vapor phase within the evaporator through the heated vapor phase-circulating line, the aqueous dispersion is flushed toward the liquid level of the liquid phase.

6. The production process according to claim 2, wherein in the step (2), a part of the aqueous dispersion taken out of the evaporator is heated in the external heat exchanger, the heated aqueous dispersion is returned to the liquid phase composed of the aqueous dispersion remaining in the evaporator through the heated liquid phase-circulating line, and at the same time the remainder of the aqueous dispersion taken out of the evaporator is returned to the vapor phase above the liquid phase within the evaporator through the non-heated vapor phase-circulating line without heating it in the external heat exchanger.

7. The production process according to claim 6, wherein a proportion circulating the aqueous dispersion to the liquid phase and the vapor phase falls within a range of 9:1 to 1:9.

8. The production process according to claim 6, wherein upon returning the aqueous dispersion to the vapor phase within the evaporator through the non-heated vapor phase-circulating line, the aqueous dispersion is flushed toward the liquid level of the liquid phase.

9. The production process according to claim 2, wherein in the step (3), the stripping under reduced pressure is conducted in such a manner that the temperature of the liquid phase composed of the aqueous dispersion remaining in the evaporator is controlled to not lower than the glass transition temperature Tg (° C.) of the polymer particles, but lower than 100° C.

10. The production process according to claim 9, wherein in the steps (2) and (3), the aqueous dispersion taken out of the evaporator is heated in the external heat exchanger to a temperature higher by a temperature exceeding 0° C., but at most 50° C. than the temperature of the liquid phase within the evaporator, and the stripping under reduced pressure is conducted while circulating the heated aqueous dispersion.

11. The production process according to claim 2, wherein in the steps (2) and (3), the stripping under reduced pressure is conducted for 1 to 25 hours in a supplied quantity of heat of 5 to 200 kcal/hr per kg of the polymer particles contained in the aqueous dispersion.

12. The production process according to claim 2, wherein in the steps (2) and (3), the quantity of heat supplied is increased step by step or continuously to conduct the stripping under reduced pressure.

13. The production process according to claim 12, wherein the stripping under reduced pressure is conducted for 0.1 to 5 hours in a supplied quantity of heat of 5 to 50 kcal/hr per kg of the polymer particles contained in the aqueous dispersion at the initial stage of the stripping under reduced pressure, and the stripping under reduced pressure is then continued for 0.5 to 20 hours in a supplied quantity of heat of 20 to 200 kcal/hr per kg of the polymer particles contained in the aqueous dispersion and in a supplied quantity of heat higher by at least 3 kcal/hr than the quantity of heat supplied per kg of the polymer particles at the initial stage at the final stage of the stripping under reduced pressure.

14. The production process according to claim 2, wherein in the step (3), the stripping under reduced pressure is conducted while supplying the aqueous dispersion distilled off by the stripping under reduced pressure.

15. The production process according to claim 2, wherein in the step (3), the stripping under reduced pressure is conducted in such a manner that the reduction speed Rs of the residual polymerizable monomer in the polymer particles is at least 10%/hr.

16. The production process according to claim 2, wherein in the step (3), the pressure within the evaporator is controlled within a range of 11 to 71 kPa in terms of absolute pressure.

17. The production process according to claim 2, wherein in the step (4), polymer particles containing a residual polymerizable monomer in a proportion of at most 100 ppm are recovered.

18. The production process according to claim 2, wherein in the step (4), after recovering the polymer particles, said polymer particles are further dried to obtain dried polymer particles containing a residual polymerizable monomer in the polymer particles in a proportion of at most 80 ppm.

19. The production process according to claim 1, wherein the polymer particles formed by the polymerization are polymer particles of a core-shell structure obtained by polymerizing a polymerizable monomer composition in an aqueous medium and then further polymerizing a polymerizable monomer in the presence of the polymer particles for core formed to form a shell.

20. A process for producing a polymerized toner, comprising the step of polymerizing a polymerizable monomer composition containing at least a polymerizable monomer and a colorant in an aqueous medium, wherein an aqueous dispersion containing formed polymer particles is subjected to stripping under reduced pressure after polymerization, and at this time the quantity of heat supplied to the aqueous dispersion is increased step by step or continuously to subject the aqueous dispersion to stripping under reduced pressure, thereby distilling off volatile organic compounds, and wherein polymer particles containing a residual polymerizable monomer in a proportion of at most 100 ppm are recovered from the dispersion.

* * * * *